A. W. EDEBORG.
TIRE CHAIN FASTENER.
APPLICATION FILED FEB. 28, 1920.
1,396,103.
Patented Nov. 8, 1921.
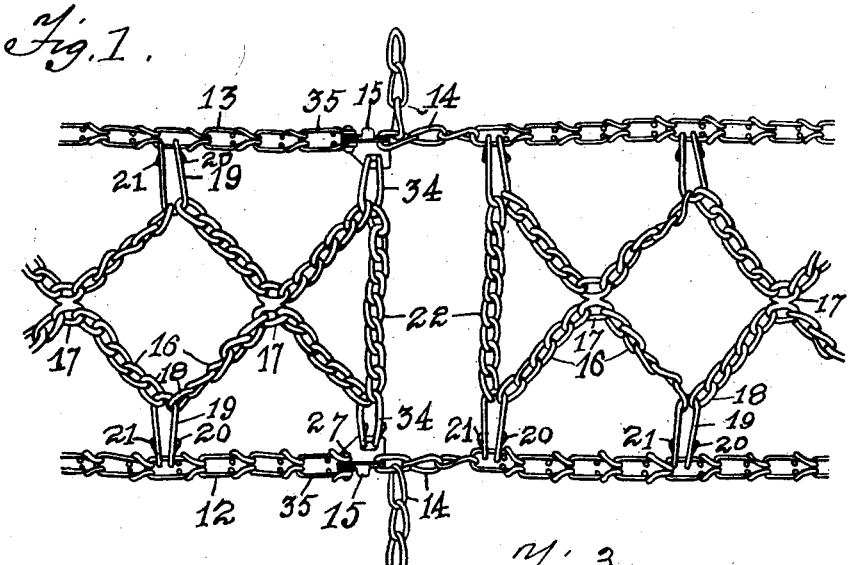
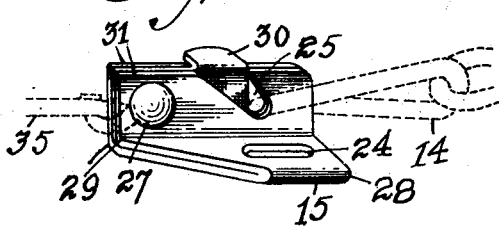
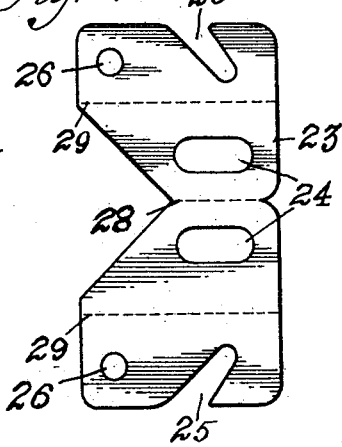
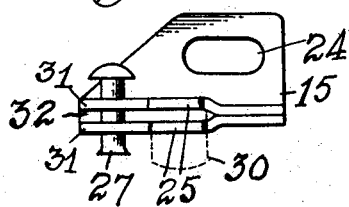
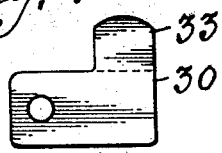

UNITED STATES PATENT OFFICE.

ALBERT W. EDEBORG, OF JAMESTOWN, NEW YORK.

TIRE-CHAIN FASTENER.

1,396,103.  Specification of Letters Patent.  Patented Nov. 8, 1921.

Application filed February 28, 1920. Serial No. 361,930.

*To all whom it may concern:*

Be it known that I, ALBERT W. EDEBORG, a citizen of the United States, residing at the city of Jamestown, in the county of Chautauqua and State of New York, have invented certain new and useful Improvements in Tire-Chain Fasteners, of which the following, taken in connection with the accompanying drawings, is a specification.

This invention relates to tire chain fasteners, and the primary object thereof is to provide a chain fastener which is formed to secure the ends of the side chains together and at the same time to afford means to anchor the ends of cross-chains.

A further object of the invention is to provide a chain fastener which is of novel construction and in which the body of the fastener is formed of a blank bent or doubled upon itself to provide a base of double thickness, and a web which latter has one end of double thickness and its opposite end spread as to the two parts of the blank to pivotally receive the latch between such spread parts.

A still further object of the invention is to provide a fastener which has an inclined slot and a latch which extends across the slot to form an acute angle with the effective wall of the slot thereby to cause the chain to wedge itself against said wall and the latch and thus prevent the chain from accidentally moving the latch to unlocked position.

In the drawings:

Figure 1, is a fragmentary plan view of a tire chain showing the manner of use of the present invention:

Fig. 2, is a perspective view of the latch:

Fig. 3, is a plan view of the blank from which the body of the fastener is formed:

Fig. 4, is a top plan view of the blank bent into final form, and

Fig. 5, is a plan view of the blank from which the latch *per se* is formed.

The latch lock 15 is struck up from heavy sheet metal plate into the form 23, the slots 24 and hook notches 25 being struck therein by means of suitable dies as well as the holes 26 for the mounting of rivet 27. The plate 23 is then folded by a suitable die at the line 28 so that the slots 24, hooks 25 and holes 26 register with one another and then said parts are given the angular bend at the line 29, thereby making an exceedingly strong hook which holds firmly in line. The latch portion 30 is hinged between the portions 31 of the plate 23, said portions 31 being spaced apart as shown at 32 sufficiently to receive the latch piece 30 therebetween. The latch piece 30 is made angular as shown in Fig. 4, the lip 33 being turned at right angles to the remaining portion of the latch, thereby forming a convenient stop and handle for manipulating said latch. The notches 25 form into a single notch which is inclined to one side sufficiently to permit the insertion and locking of one of the links 14 therein when in the closed position, as shown in dotted outline in Fig. 2. The hook links 34 attach in the slots 24 at each side and the end links 35 of the chains 12 and 13 attach on the rivet 27 which rivet has sufficient length to permit of such attachment.

It is now apparent that the ends of the chains may be quickly and adjustably attached to one another by means of the simple yet strong hook latch 15, it simply being necessary to operate the latch piece 30 to hold the link 14 as desired in order to attach the grip chain firmly upon the wheel.

Referring to Fig. 2, it will be seen that the effective part of slot 25 forms an acute angle with the effective end of the latch, so that the chain will wedge in such angle and thereby prevent accidental opening of the latch by the chain movements.

I claim as new:

1. In a tire chain latch, an L-shaped member having a chain receiving opening in its base and having a slot in its web extending at an acute angle to the longitudinal axis of the member and through the top edge of the web, said web having a bifurcated part, a latch member in the bifurcated part of the web having a wall adapted to extend in front of the slot of the web at approximately right angles to longitudinal axis of the L-shaped member and a rivet for pivotally mounting the latch member.

2. In a tire chain fastener, a member composed of two superimposed approximately L-shaped parts integrally connected along the outer sides of the bases of the parts and having registering chain receiving openings in said bases, the webs having registering slots extending through their free edges, and a latch pivoted to the webs for guarding the slots.

3. In a tire chain latch, an L-shaped member having a chain receiving opening in its base and having a slot extending through the edge of the web of the member, and a pivoted latching member to prevent movement of the chain out of the slot.

4. In a tire chain latch, a member having a slot and a bifurcated part to one side of the slot, and a latching member pivoted in the bifurcated part and having an edge disposed at an angle to the plane of the slot to prevent movement of the chain out of the slot.

5. In a tire chain latch, a member composed of two parts formed with a slot, the parts on one side of the slot abutting each other to form a practically single wall and the parts on the opposite side of the slot being spaced apart, and a latching member pivoted in the space between said spaced parts to guard the slot.

6. In a tire chain fastener, a member composed of two superimposed approximately L-shaped parts integrally connected along the outer sides of the bases of the parts and having registering chain receiving openings in said bases, the webs having registering slots extending through their free edges, and the webs on one side of the slots being spread apart, and a latch pivoted between the spread parts of the webs for guarding the slots.

In testimony whereof I affix my signature in the presence of two witnesses.

ALBERT W. EDEBORG.

Witnesses:
C. V. SWANSON,
A. W. NETTLE.